J. CAWLEY AND F. HILLS.
CONNECTING ROD AND CRANK SHAFT.
APPLICATION FILED AUG. 17, 1920.
1,399,713.
Patented Dec. 6, 1921.
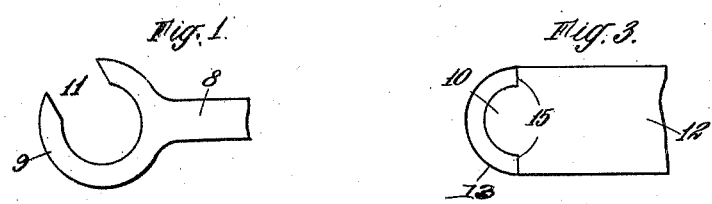
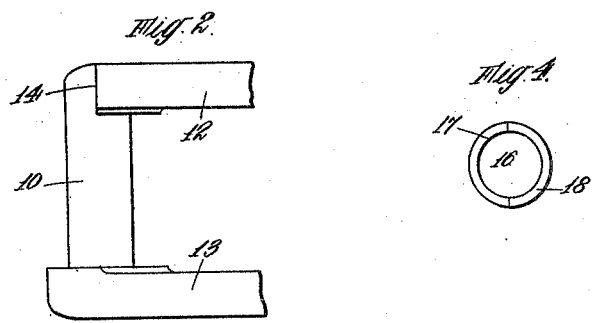
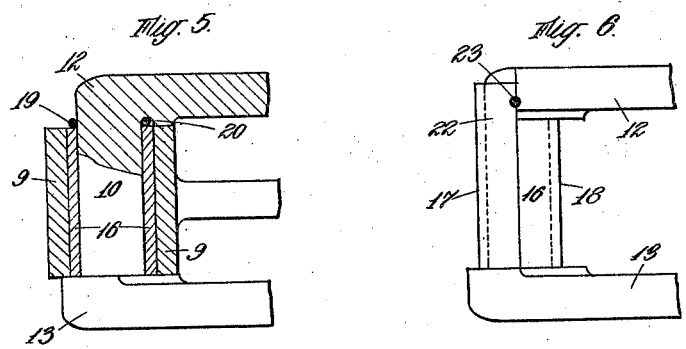
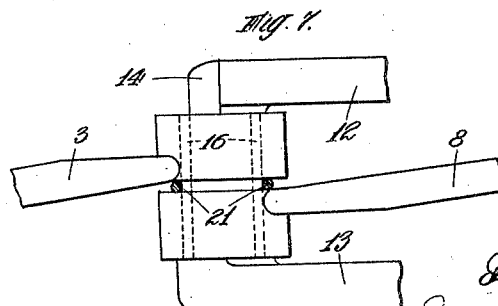

UNITED STATES PATENT OFFICE.

JAMES CAWLEY AND FRANK HILLS, OF WESTMINSTER, ENGLAND, ASSIGNORS TO THE GLOBE PNEUMATIC ENGINEERING COMPANY, LIMITED, OF WESTMINSTER, LONDON, ENGLAND.

CONNECTING-ROD AND CRANK-SHAFT.

1,399,713.     Specification of Letters Patent.     Patented Dec. 6, 1921.

Application filed August 17, 1920. Serial No. 404,192.

*To all whom it may concern:*

Be it known that we, JAMES CAWLEY and FRANK HILLS, both subjects of the King of Great Britain, residing at 1 Victoria street, Westminster, in the county of London, England, have invented certain new and useful Improvements in Connecting-Rods and Crank-Shafts, of which the following is a specification.

The present invention relates to connecting or assembling devices for connecting-rods and crankshafts and is especially applicable for use in connection with single-acting engines such as compressed air or pneumatic engines, the said devices being of the kind in which the connecting rods are provided with an annular connecting portion or "big end" adapted to engage with the pin of the crankshaft.

According to this invention the annular big end of the connecting rod is formed with a lateral opening or gap the width of which is just sufficient to enable the said big end to be passed laterally over the crank pin and the internal diameter of the said annular big end is greater than the diameter of the said crank pin to provide an annular space between these parts for a divided or split retaining bush or sleeve to be inserted endwise part by part, the part or parts that lie between the webs of the crankshaft being positioned by an angular movement about the crank pin after being inserted endwise into the annular space as aforesaid. A portion of one of the webs of the crankshaft is cut away around the said crank pin so as to leave part of the periphery thereof projecting from the said crank web and to thereby enable the portions of the said bush or sleeve to pass endwise into the position as aforesaid. One or more connecting rods may be thus mounted on the crankpin and retained in position thereon in an effective and expeditious manner. Means may also be provided for preventing the parts of the bush or sleeve from sliding or rotating on the crank pin when the engine is running.

In order that the said invention may be clearly understood and readily carried into effect we shall describe the same more fully with reference to the accompanying drawing in which—

Figure 1 is a detail view showing a connecting rod provided with a big end which is constructed according to this invention.

Fig. 2 is a detail view showing a crankshaft provided with webs which are shaped according to the said invention.

Fig. 3 is an end view of the crankshaft shown in Fig. 2.

Fig. 4 is a detail view showing the split or divided bush or sleeve which fits over the crank pin of the crankshaft shown in Figs. 2 and 3.

Figs. 5, 6 and 7 are views showing various means for securing the split or divided bush or sleeve in position.

8 is the connecting rod which is provided as shown in Fig. 1 with an outer annular portion 9 constituting the big end thereof which has an internal diameter suitably larger than the diameter of the crank pin 10 so as to provide an annular space between these parts. The said big end is formed with a gap 11 the width of which is smaller than the internal diameter of the annular big end 9 but sufficiently large to allow the latter to pass laterally over the crank pin 10. 12 and 13 are the crank webs which are provided as usual at the ends of the crank pin 10, the crank web 12, in the example shown in Figs. 2 and 3, being cut away around the crank pin 10 as shown at 14 so as to leave substantially half the periphery thereof projecting from the said crank web 12 and to thus form thereon shoulders 15 adjacent to the crank pin 10. 16 is the split or divided bush or sleeve which is constructed as shown in Fig. 4 in two semicircular portions or halves 17 and 18 having an internal diameter substantially equal to the diameter of the crank pin 10 and an external diameter substantially equal to the internal diameter of the annular big end 9.

The hereinbefore described parts are assembled as follows:—After the big end 9 of the connecting rod 8 has been passed laterally over the crank pin 10, one of the half portions of the split bush 16 is slid along the cut-away portion 14 of the crank web 12 over the crank pin 10 and is given a half turn or rotated through 180 degrees, and the other half portion of the split bush 16 is similarly passed over the crank pin 10 between the latter and the inner surface of the big end 9, the said split bush thus forming an enlargement of the crank pin 10 for retaining the big end 9 in place and providing a bearing for the said big end as best seen in Fig. 5.

In order to prevent the split bush 16 from sliding laterally along the crank pin 10 when the engine is running, an open circular spring 19 adapted to fit in a semi-circular groove 20 in the crank web 12 may be sprung over the crank pin 10 as shown in Fig. 5 after the various parts of the connecting device have been assembled as hereinbefore described. The split bush 16 may also be retained in position, as shown in Fig. 7 which illustrates the manner in which two connecting rods 8, 8 may be mounted on the crank pin 10, by means of an open circular spring 21 sprung over a groove around the periphery of the said split bush.

In cases where it is found desirable to prevent the split bush 16 from rotating around the crank pin 10 and to thus avoid or reduce wear thereon, the half portion 17 of the split bush 16 which is last fitted endwise over the crank pin 10 is provided as shown in Fig. 6 with an extension 22 which extends over the cut away portion of the crank web 12, and the split bush 16 is secured in position by means of a split pin 23 or the like which passes through a hole provided in the crank web 12 and which engages with the extension 22 of the half portion 17 of the said split bush. The said extension 22 may be attached to or made to engage with the shoulders 15 of the crank web 12 in any other suitable manner. The split bush 16 may be further secured in position by means of an open circular spring, which may be disposed or sprung as hereinbefore described in the case of the spring 19 or of the spring 21, so as to prevent any lateral displacement thereof, the engaged extension 22 of the half portion 17 securing the said split bush against rotation as explained above.

A connecting or assembling device in accordance with the present invention comprises a considerably reduced number of separate parts and provides a rigid and efficient mechanism safeguarded against vibration and working stresses without necessitating the use of numerous locking devices or the employment of a crankshaft of special construction or of a big end of unduly large size, thereby effecting an appreciable saving in the amount of time and labor entailed in assembling the said device as compared with the connecting devices which have been hitherto employed. The said device is also light and compact, combining strength with simplicity of construction and is at the same time comparatively inexpensive to manufacture.

What we claim and desire to secure by Letters Patent of the United States is:—

1. An assembling device for connecting rods and crank shafts, consisting in the combination of an annular big end formed with a lateral opening, the width of which is just sufficient to enable the said big end to be passed laterally over the crank pin, and the internal diameter of the said annular big end is greater than the diameter of the said crank pin to provide an annular space between these parts when assembled, and means adapted to be introduced into said annular space for retaining the said annular big end in position on the said crank pin.

2. An assembling device for connecting rods and crank shafts, consisting in the combination of an annular big end formed with a lateral opening, the width of which is just sufficient to enable the said big end to be passed laterally over the crank pin, and the internal diameter of the said annular big end is greater than the diameter of the said crank pin to provide an annular space between these parts, a portion cut away from one of the crank webs to leave part of the crank pin exposed at one end, and a divided retaining bush introduced into said annular space endwise, part by part, over the exposed end of the crank pin, the part of the said divided bush which lies between the crank webs being positioned by an angular movement around the crank pin.

3. An assembling device for connecting rods and crank-shafts, consisting in the combination of an annular big end formed with a lateral opening, the width of which is just sufficient to enable the said big end to be passed laterally over the crank pin, and the internal diameter of the said annular big end is greater than the diameter of the said crank pin to provide an annular space between these parts, a portion cut away from one of the crank webs to leave part of the crank pin exposed at one end, a divided retaining bush introduced into said annular space endwise, part by part over the exposed end of the crank pin, the part of the said divided bush which lies between the crank webs being positioned by an angular movement around the crank pin, and means for retaining the said divided bush in place on the crank pin.

4. An assembling device for connecting rods and crank shafts, consisting in the combination of an annular big end formed with a lateral opening, the width of which is just sufficient to enable the said big end to be passed laterally over the crank pin, and the internal diameter of the said annular big end is greater than the diameter of the said crank pin to provide an annular space between these parts, a portion cut away from one of the crank webs to leave part of the crank pin exposed at one end, a divided retaining bush introduced into the said annular space endwise part by part over the exposed end of the crank pin, the part of the said divided bush which lies between the crank webs being positioned by an angular movement around the crank pin, and an open circular retaining spring adapted to be sprung into a groove provided for its reception.

5. An assembling device for connecting rods and crank shafts, consisting in the combination of an annular big end formed with a lateral opening, the width of which is just sufficient to enable the said big end to be passed laterally over the crank pin, and the internal diameter of the said annular big end is greater than the diameter of the said crank pin to provide an annular space between these parts, a portion cut away from one of the crank webs to leave part of the crank pin exposed at one end, a divided retaining bush introduced into said annular space endwise part by part over the exposed end of the crank pin, the part of the said divided bush which lies between the crank webs being positioned by an angular movement around the crank pin, and an open circular retaining spring adapted to be sprung into a semi-circular groove in the crank-web.

JAMES CAWLEY.
FRANK HILLS.